US 8,670,693 B2

(12) United States Patent
Nomura et al.

(10) Patent No.: US 8,670,693 B2
(45) Date of Patent: Mar. 11, 2014

(54) PHOTOSENSITIVE DRUM, PROCESS CARTRIDGE AND FLANGE MOUNTING METHOD

(75) Inventors: Keisuke Nomura, Suntou-gun (JP); Tomonori Mori, Numazu (JP); Isao Koishi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 13/110,838

(22) Filed: May 18, 2011

(65) Prior Publication Data

US 2011/0286764 A1    Nov. 24, 2011

(30) Foreign Application Priority Data

May 21, 2010  (JP) .................................. 2010-117055

(51) Int. Cl.
*G03G 15/00* (2006.01)
*G03G 15/02* (2006.01)

(52) U.S. Cl.
USPC ............................ 399/117; 399/116; 399/159

(58) Field of Classification Search
USPC .................................. 399/116, 117, 159, 167
See application file for complete search history.

(56) References Cited

U.S. PATENT DOCUMENTS

| | | | | |
|---|---|---|---|---|
| 5,543,473 A | * | 8/1996 | Fuei et al. | 525/399 |
| 5,907,750 A | * | 5/1999 | Yamada et al. | 399/116 |
| 5,983,055 A | * | 11/1999 | Bito et al. | 399/159 |
| 5,991,571 A | * | 11/1999 | Yamada et al. | 399/117 |
| 6,127,622 A | | 10/2000 | Yamada et al. | |
| 6,324,364 B1 | | 11/2001 | Nomura et al. | |
| 6,868,243 B2 | * | 3/2005 | Watanabe et al. | 399/113 |

FOREIGN PATENT DOCUMENTS

| JP | 7-64447 A | 3/1995 |
|---|---|---|
| JP | 2000-315037 A | 11/2000 |

OTHER PUBLICATIONS

Japanese Office Action dated Mar. 12, 2013 in Japanese Application No. 2011-098939 (with partial translation).

* cited by examiner

*Primary Examiner* — Sandra Brase
(74) *Attorney, Agent, or Firm* — Fitzpatrick, Cella, Harper and Scinto (57) ABSTRACT

A photosensitive drum for use with an image forming apparatus, includes a cylinder; a flange provided at a longitudinal end of said cylinder, wherein the flange has an outer diameter smaller than an inner diameter of the cylinder; and a resin material injected in a gap in a radial direction between the cylinder and the flange and fixing said flange to the cylinder.

28 Claims, 11 Drawing Sheets

PHOTOSENSITIVE DRUM, PROCESS CARTRIDGE AND FLANGE MOUNTING METHOD

FIELD OF THE INVENTION AND RELATED ART

The present invention relates to a photosensitive drum for forming and carrying an image, a process cartridge detachably mountable to an image forming apparatus, and the image forming apparatus.

As a method of fixing a flange on a cylinder, the following constitution has been known. The cylinder constituting the photosensitive drum is provided, at its end portion, with a through hole along a circumferential direction. The flange includes an engaging portion to be engaged with an inner circumferential surface of the cylinder and includes a groove portion at the engaging portion. The cylinder and the flange are engaged with each other and then a resin material is injected into the groove portion through the through hole (Japanese Laid-Open Patent Application No. 2000-315037; e.g., claim 14 and FIG. 12).

However, in the conventional constitution, the cylinder and the flange are positioned by the engagement and the resin material is injected into the groove portion located between the cylinder and the flange. Therefore, variation in positioning accuracy is caused depending on accuracy of parts.

SUMMARY OF THE INVENTION

The present invention has been accomplished in view of the above-described problem.

A principal object of the present invention is to provide a photosensitive drum capable of positioning a flange relative to a cylinder with high accuracy irrespective of dimensional accuracy of parts.

Another object of the present invention is to provide a process cartridge including the photosensitive drum and to provide an image forming apparatus including the process cartridge.

According to an aspect of the present invention, there is provided a photosensitive drum for use with an image forming apparatus, comprising:

a cylinder;

a flange provided at a longitudinal end of said cylinder, wherein the flange has an outer diameter smaller than an inner diameter of the cylinder; and a resin material injected in a gap in a radial direction between the cylinder and the flange and fixing said flange to the cylinder.

According to another aspect of the present invention, there is provided a process cartridge detachably mountable to an image forming apparatus, comprising:

a photosensitive drum including: a cylinder; a flange provided at a longitudinal end of said cylinder, wherein the flange has an outer diameter smaller than an inner diameter of the cylinder; and a resin material injected in a gap in a radial direction between the cylinder and the flange and fixing said flange to the cylinder.

According to a further aspect of the present invention, there is provided a flange mounting method of mounting a flange to a longitudinal end portion of a cylinder, the method comprising:

a temporary positioning step of temporarily positioning the flange with a jig so that an outer diameter portion of the flange opposes an inner diameter portion of the cylinder with a gap in a radial direction between the flange and the cylinder; and an injection step of injecting a resin material, into the gap, for fixing the flange to the cylinder.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

Part (a) of FIG. 4 is a sectional view when positioning of the flange is effected, and (b) of FIG. 4 is a sectional view showing a state immediately before a resin material is injected between the flange and the cylinder.

Part (a) of FIG. 5 is a sectional view showing a state when the resin material is injected between the flange and the cylinder, and (b) of FIG. 5 is a sectional view showing a state in which the flange is rotation-stopped relative to the cylinder by caulking (staking).

Part (a) of FIG. 9 is a sectional view showing a state immediately before positioning between the cylinder and the flange in Third Embodiment, and (b) of FIG. 9 is a sectional view showing a state in which the flange is engaged with the cylinder to effect the positioning.

Part (a) of FIG. 10 is a sectional view showing a state in which the flange has been engaged with the cylinder to effect the positioning, and (b) of FIG. 10 is a sectional view showing a state in which the resin material is injected between the flange and the cylinder.

DESCRIPTION OF THE PREFERRED EMBODIMENTS

Hereinbelow, embodiments of the image forming apparatus according to the present invention will be described.

First Embodiment

General Structure of Image Forming Apparatus

Figure 12:
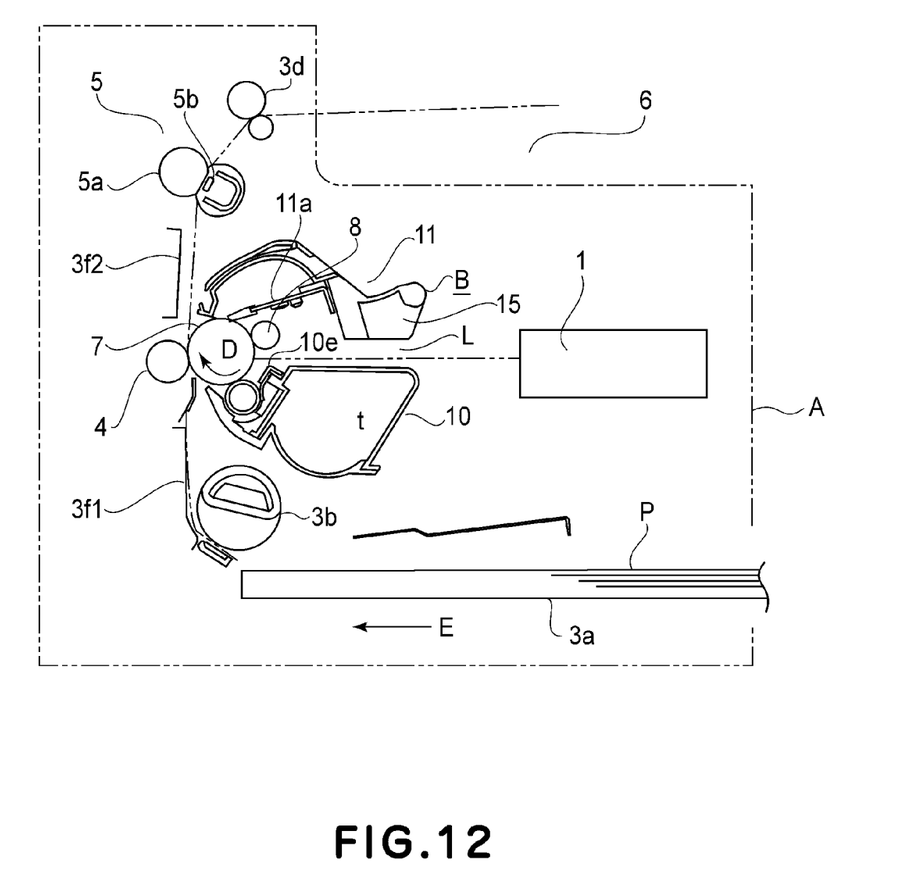
FIG. 12 is a sectional view showing a general structure of an image forming apparatus A in First Embodiment.

FIG. 12 is a sectional view showing a general structure of an image forming apparatus A which is a laser beam printer of an electrophotographic type.

Further, a process cartridge B is prepared by integrally assembling a photosensitive drum 7, a charging roller 8 and a developing device 10 or a cleaning device 11 into a cartridge, which is detachably mountable to a main assembly of the image forming apparatus A.

At a right side of the mounted process cartridge B, a laser scanner unit 1 is provided. Below the mounted process cartridge B, a sheet tray 3a for accommodating, a sheet material P which is a recording material to be subjected to image formation is provided.

Along a conveyance direction of the sheet material P (along an arrow E direction), a feeding roller 3b, a transfer guide 3f1, a transfer roller 4, a conveyance guide 3f2, a fixing device 5, a discharging roller pair 3d and a discharge tray 6 are disposed.

Figure 13:
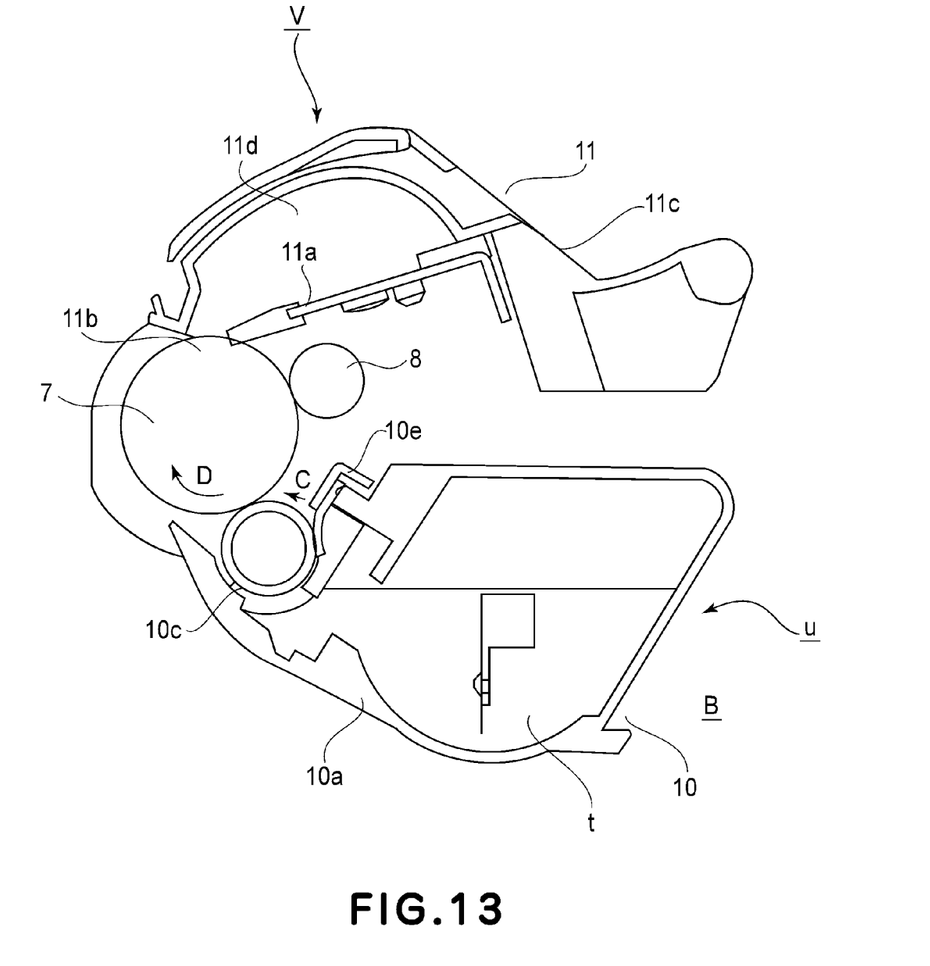
FIG. 13 is a sectional view showing a structure of a process cartridge in the image forming apparatus in First Embodiment.

With reference to FIG. 13, the process cartridge B will be described.

FIG. 13 is a sectional view of the contact B. The photosensitive drum 7 is rotatably supported at both end portions by a supporting member. A drive force is transmitted from a driving source (not shown) to one of the end portions of the photosensitive drum 7, so that the photosensitive drum 7 is rotationally driven in an arrow D direction in FIG. 12.

In a cleaning unit V, the photosensitive drum 7 is rotatably provided on a cleaning frame 11c. Further, the cleaning frame 11c is rotatably provided with the charging roller 8 for uniformly charging the surface of the photosensitive drum 7. A cleaning blade 11a is supported by the cleaning frame 11c and removes a developer (residual toner) remaining on the photosensitive drum 7 after transfer.

The residual toner on the photosensitive drum 7 passes through a drum contact portion of a flexible sheet member 11b to reach a position of the cleaning blade 11a. The residual toner removed from the surface of the photosensitive drum 7 by the cleaning blade 11a is collected in a residual toner chamber 11d provided at a rear portion of the cleaning frame 11c. The developing device 10 is constituted by a developing sleeve 10c which is rotated in an arrow C direction in FIG. 13 with a small gap between itself and the photosensitive drum 7, and by a developing device frame 10a for accommodating toner t.

The developing device frame 10a is prepared by ultrasonic welding or the like to constitute a developing container unit u. The developing sleeve 10c is rotatably supported by the developing container unit u via a bearing member (not shown).

(Image Forming Process of Image Forming Apparatus)

Next, an image forming process of the image forming apparatus A in this embodiment will be schematically described with reference to FIGS. 12 and 13.

In the image forming apparatus A, the photosensitive drum 7 is rotationally driven in an arrow D direction in FIG. 12 at a predetermined peripheral speed. To an outer peripheral surface of the photosensitive drum 7, the charging roller 8 supplied with a bias voltage is contacted, so that the outer peripheral surface of the photosensitive drum 7 is uniformly charged by the charging roller 8. From the laser scanner unit 1, laser light L modulated correspondingly to a time-serial electric digital pixel signal of objective image information is outputted and enters an inside of the process cartridge B through a right-side exposure window portion, so that the outer peripheral surface of the photosensitive drum 7 is scanning-exposed. As a result, on the outer peripheral surface of the photosensitive drum 7, an electrostatic latent image corresponding to the objective image information is formed. The electrostatic latent image is developed into a toner image with the toner t which is regulated in layer thickness by the developing blade 10e and is applied onto the photosensitive drum 7.

On the other hand, the sheet material P is fed from the sheet tray 3a by the feeding roller 3b and is conveyed to a transfer position between the photosensitive drum 7 and the transfer roller (transfer means) 4 via the transfer guide 3f1. At the transfer position, the toner image on the photosensitive drum 7 is successively transferred from the photosensitive drum 7 onto the sheet material P.

The sheet material P on which the toner image is transferred is separated from the photosensitive drum 7 and is conveyed to the fixing device 5, and thus passes through a nip between a fixing roller 5b and a pressing roller 5a. In the nip, the toner image is pressed and heated, thus being fixed on the sheet material P. The sheet material P on which the toner image is fixed is conveyed to the discharging roller pair 3d and then is discharged on the discharge tray 6.

On the other hand, the residual toner on the outer peripheral surface of the photosensitive drum 7 after the transfer is removed by the cleaning blade 11a of the cleaning device 11 and then is again subjected to the image forming process starting from the charging described above. Incidentally, the charging roller 8, the developing sleeve 10c, the cleaning blade 11a and the like constitute process means for executing the image formation on the photosensitive drum 7.

(Constitution of Photosensitive Drum and Flange)

With reference to FIGS. 1 to 5, a constitution of the photosensitive drum and the flange in this embodiment will be described.

Figure 1:
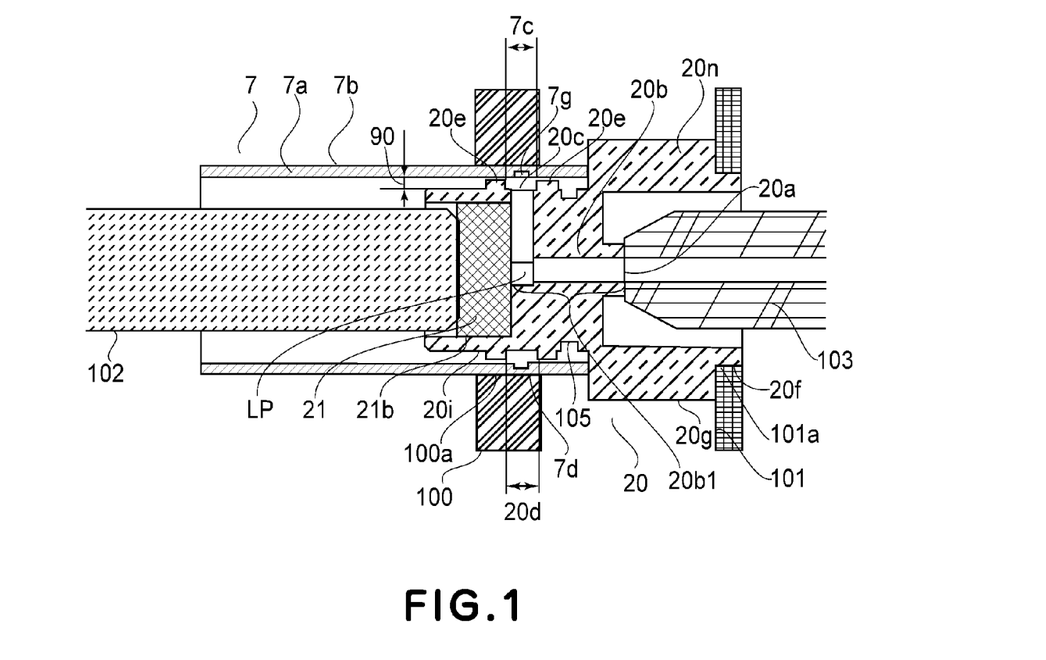
FIG. 1 is a sectional view showing a resin material connecting portion between a cylinder and a flange in First Embodiment taken along a line parallel to an axis of a photosensitive drum.
Figure 2:
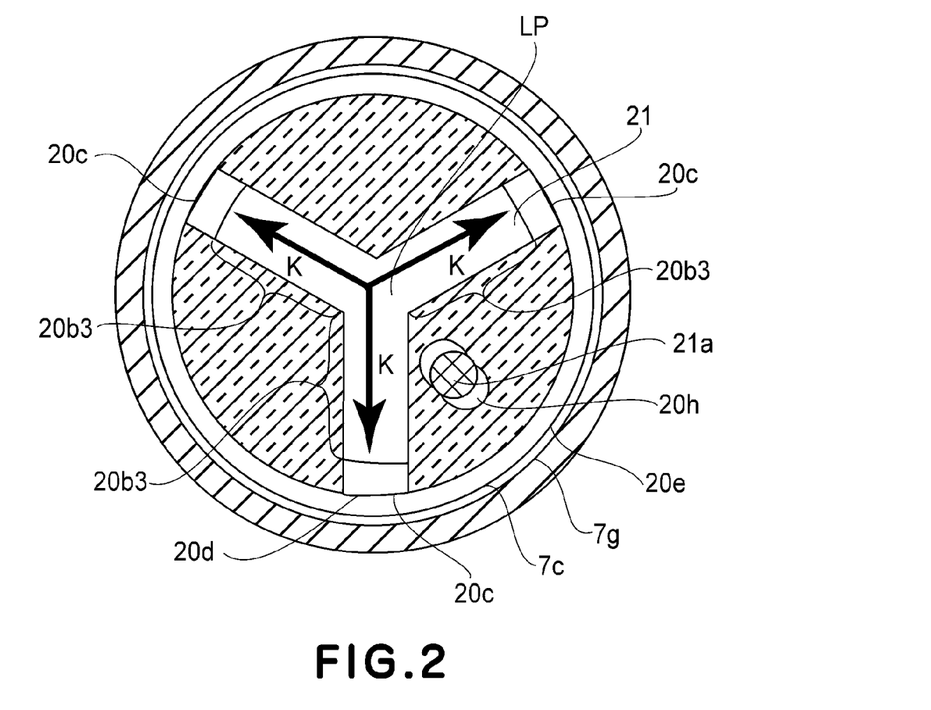
FIG. 2 is a sectional view showing the resin material connecting portion between the cylinder and the flange in First Embodiment taken along a line perpendicular to the axis of the photosensitive drum.
Figure 3:
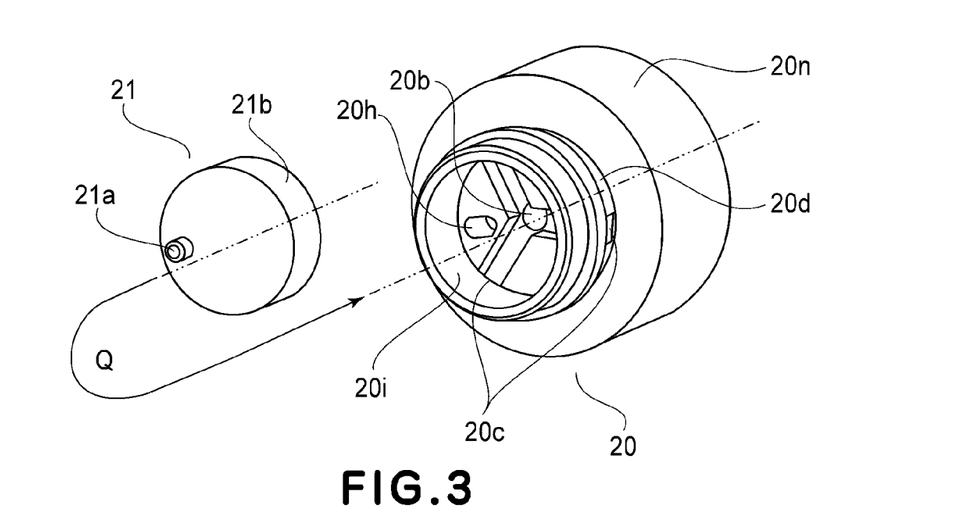
FIG. 3 is an exploded perspective view of the flange and a back-up portion in First Embodiment.
Figure 4:
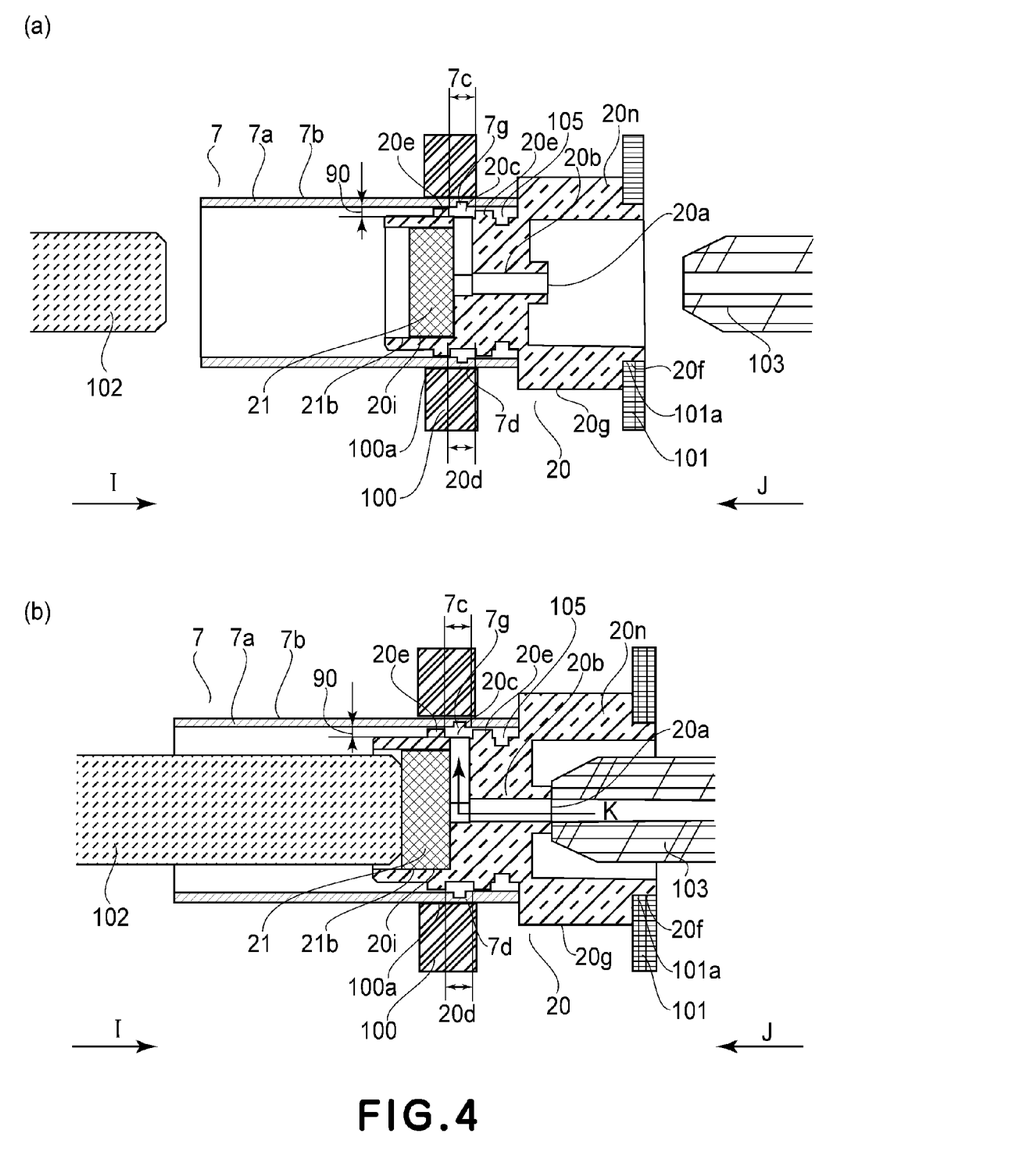
Figure 5:
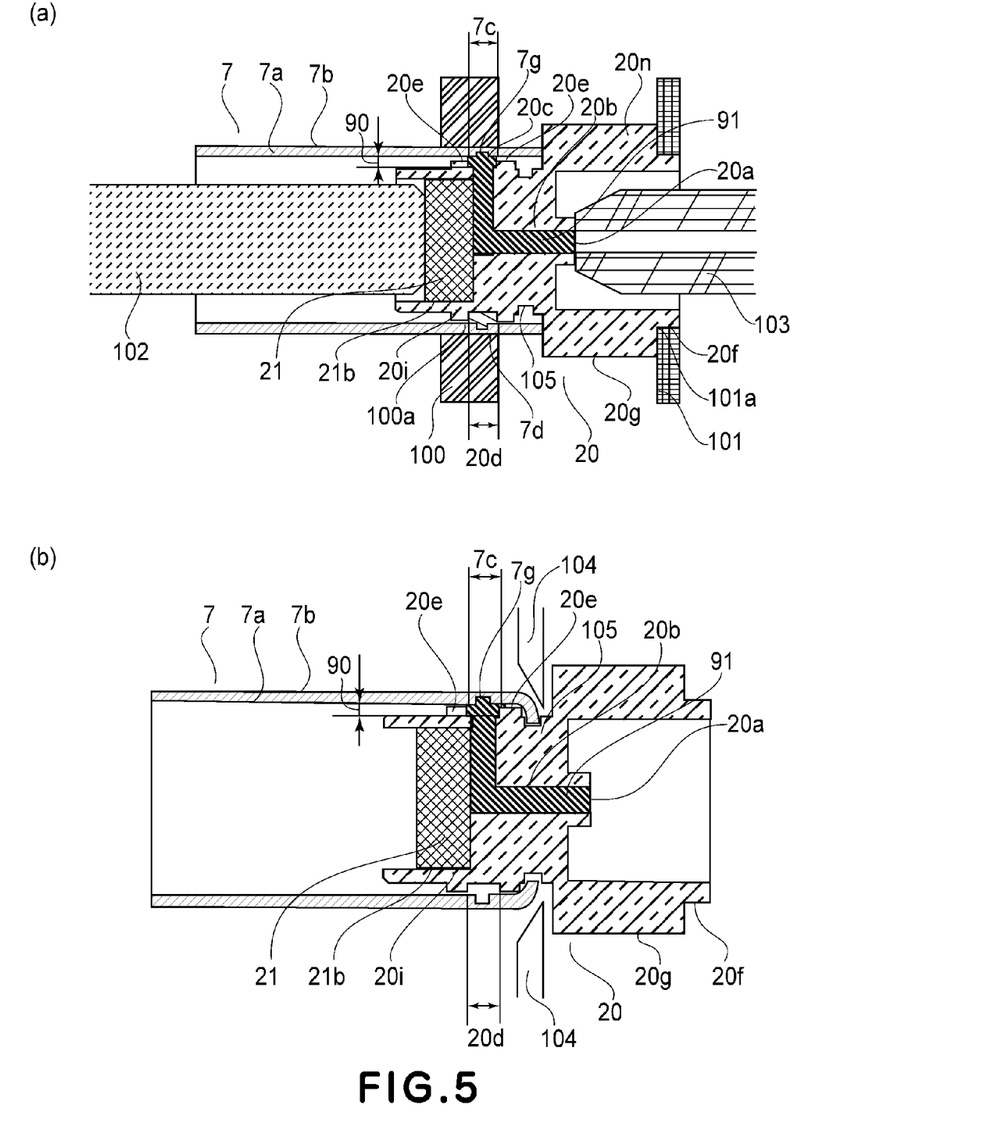

FIG. 1 is a sectional view for illustrating resin material connection between the cylinder and the flange. FIG. 2 is a sectional view for illustrating a flowing direction of the resin material to be injected. FIG. 3 is an exploded perspective view for illustrating the flange and the back-up portion. FIGS. 4 and 5 are sectional views for illustrating steps of manufacturing the photosensitive drum.

As shown in FIG. 1, the photosensitive drum 7 has a structure such that a photosensitive layer 7b is provided on an outer peripheral surface of a hollow metal cylinder 7a and a flange 20 is mounted at an inner peripheral portion of longitudinal end portions of the cylinder 7a. The photosensitive drum 7 is provided with a positioning portion 7d at an outer peripheral end portion of the cylinder 7a and the positioning portion 7d is aligned with a positioning portion 100a of a first jig 100. Further, the cylinder 7a is provided with a connecting portion 7c (first adhesion area) with the injected resin material at an inner peripheral end portion and a recessed portion 7g along a circumferential direction of the connecting portion 7c. The resin material is injected into the recessed portion 7g, so that the cylinder 7a and the flange 20 are retained with respect to a longitudinal direction.

At the outer peripheral portion of the flange 20, a portion to be connected (second adhesion area) 20d constituting a clearance fit between the cylinder 7a and the connecting portion 7c is provided. The portion to be connected 20d forms a gap 90 between itself and the connecting portion 7c by disposing the flange 20 so as to enter the cylinder 7a to oppose the connecting portion 7c. The resin material is injected into the gap 90 and the photosensitive drum 7 and the cylinder 7a are coaxially fixed. At this time, dimensions of the cylinder 7a and the flange 20 are set so that a distance of the gap 90 is 0.5 mm or more and 1.5 mm or less in order to minimize a deviation in co-axiality between the cylinder 7a and the flange 20 due to the influence of heat contraction of the injected resin material. When the gap 90 is less than 0.5 mm, the flow path is narrowed and thus the pressure is locally increased, so that deformation of the cylinder 7a is caused and the co-axiality is deviated. Further, when the gap 90 is more than 1.5 mm, an amount of the resin material to be injected is increases, so that the co-axiality is deviated due to the heat contraction. That is, an amount of the heat contraction can be suppressed by the injection of the resin material in a small amount, so that jerky after assembling of the cylinder 7a with the flange 20 can be prevented.

At an end portion of a sheet portion 20n of the flange 20, a positioning portion 20f is provided. Further, an injection flow path 20b extends from an injection port 20a to a predetermined position LP along a center axis 20b1 of the flange 20 and then is changed in direction, and outward extends toward the gap 90 in the radial direction of the flange 20. Then, the positioning portion 20f is engaged with a positioning portion 101a of a second jig 101, so that the flange 20 is positioned. Then, the resin material is injected from the injection port 20a, provided at the center of the flange 20, into the gap 90 through the injection flow path (resin material flow path) 20b.

Thus, the resin material can be easily injected into the gap 90 and by the injection of the resin material in a small amount, adhesiveness between the cylinder 7a and the flange 20 can be improved.

Further, as shown in FIG. 2, the injection flow path 20b directed outward from the center of rotation of the flange 20 in the radial direction includes three flow paths 20b3 and is disposed so that a flow rate of the resin material ejected from the center of the flange 20 is constant and the three flow paths 20b3 are disposed equidistantly (equiangularly). The portion to be connected 20d is provided with a discharge outlet 20c so that the resin material 91 passed through the injection flow path 20b and is filled in the gap 90 through the discharge outlet 20c. Further, in order to minimize a degree of movement of the resin material in the longitudinal direction when the resin material is discharged through the discharge outlet 20c, at a longitudinal end-side position, a preventing portion 20e is provided at an outer diameter portion of the flange 20.

Further, as described above, the three flow paths 20b3 have the same cross-sectional area so as to provide the same flow rate per unit time of the passing resin material. The three flow paths 20b3 are configured and positioned radially and equiangularly to provide the same flow rate, so that an ejection pressure is exerted on the cylinder 7a uniformly and thus positioning accuracy between the photosensitive drum 7 and the flange 20 can be improved.

Incidentally, in this embodiment, the three rectilinear flow paths 20b3 are provided but four or more flow paths may also be provided equiangularly and radially. Further, by disposing the injection flow paths 20b3 in this manner, the resin material 91 after the injection and the flange 20 can be prevented from sliding in the circumferential direction.

Next, as shown in FIG. 3, a back-up portion 21 for forming the injection flow path 20b by being combined with the flange 20 is provided. The back-up portion 21 is moved in an arrow Q direction, so that a positioning portion 21a of the back-up portion 21 is engaged in an engaging hole 20h which is provided at an end portion of the flange 20 while avoiding the injection flow path 20b. Further, an outer circumferential portion 21b of the back-up portion 21 is engaged with an inner circumferential portion 20i of the flange 20. As a result, positioning between the back-up portion 21 and the flange 20 is effected (back-up portion mounting step). Thus, by using the flange 20 and the back-up portion 21 in combination as separate parts, a mold constitution of the flange can be simplified, so that cost reduction can be realized.

Here, with reference to FIGS. 2, 4 and 5, the photosensitive drum manufacturing method (flange mounting method) will be described step by step.

First, a temporary positioning step of the flange 20 in which the flange 20 is positioned relative to the cylinder 7a will be described.

As shown in (a) of FIG. 4, the positioning portion 7d of the photosensitive drum 7 and the positioning portion 100a of the first jig 100 are aligned with each other. Further, the positioning portion 20f provided at the end portion of the shaft portion 20n of the flange 20, and the positioning portion 101a of the second jig 101 are aligned with each other. Further, the first jig 100 and the second jig 101 are positioned and fixed with high accuracy, so that the photosensitive drum 7 and the flange 20 are aligned with each other (temporary flange positioning step). As a result, the gap 90 is provided between the connecting portion 7c and the portion to be connected 20d. That is, the flange 20 is provided at the end portion with the shaft portion 20n for positional alignment and by engaging the second jig 101 in the shaft portion 20n, so that the distance of the gap 90 is adjustable.

Next, an injection step of injecting the resin material will be described.

As shown in (b) of FIG. 4, when the resin material is injected, an ejection molding machine (not shown) is provided with a nozzle 103 for permitting ejection of the resin material and with a supporting member 102 for supporting the back-up portion 21 positioned relative to the flange 20. The supporting member 102 moves in an arrow I direction to support the back-up portion 21 and then the nozzle 103 moves in an arrow J direction and stops at a position in which the nozzle 103 is contacted to the injection port 20a.

As shown in FIG. 2, (b) of FIG. 4 and (a) of FIG. 5, when the resin material 91 is injected from the nozzle 103, the resin material 91 passes through the injection port 20a, the injection flow path 20b and the discharge outlet 20c in this order in an arrow K direction. Then, the resin material 91 is filled in the gap 90 and the recessed portion 7g and is solidified, so that the cylinder 7a is positioned relative to the flange 20 with respect to the radial direction by the resin material 91. Further, at that time, the resin material 91 which will flow toward longitudinal end portions (outward direction) through the discharge outlet 20c can be stopped by the preventing portion (projection) 20e disposed at an outer diameter portion of the flange 20, thus being placed in a state shown in (a) of FIG. 5. During the injection of the resin material, the back-up portion 21 applies a back-up force in the arrow I direction so as not to be separated from the flange 20 by being pressed by an injecting force of the resin material 91.

Next, as a constitution of rotation stop of the cylinder 7a and the flange 20, caulking (staking) connection as shown in (b) of FIG. 5 will be described.

In a state in which the flange 20 is inserted into the cylinder 7a, the positioning between the cylinder 7a and the flange 20 is performed by using a jig (not shown). At this time, central axes of the cylinder 7a and the flange 20 are aligned with each other in advance so that a position of a caulking hole 105 provided in the flange 20 can coincide with a position of a punch 104 which is a caulking tool. Next, the punch 104 (caulking tool) is moved inward in the radial direction of the cylinder 7a, so that a part of the circumferential end portion of the photosensitive drum 7 is plastically deformed and thus the cylinder 7a and the flange 20 are rotation-stopped.

By employing the above constitution, irrespective of dimension accuracy of parts, the positional accuracy between the cylinder 7a and the flange 20 can be improved. Further, there is no need to process and mold the inner diameter portion of the cylinder 7a and the outer diameter portion of the flange 20 with high accuracy, so that a processing cost can be reduced. Further, by the injection of the resin material, a low rigidity portion of the flange 20 is decreased and thus the rigidity of the flange 20 is increased, so that torsion can be suppressed and thus an image quality can be improved.

The injected resin material is high-impact polystyrene (HIPS) in this embodiment but is not limited thereto.

Further, in this embodiment, the flange 20 is integrally molded with a drive transmitting portion 20g for transmitting a driving force to other process means or portions (not shown). Relative to the cylinder 7a, the drive transmitting portion 20g of the flange is improved in positional accuracy and rotational accuracy, so that the improvement in image quality can be realized. Further, at the end portion of the flange 20, a coupling (not shown) engageable with a drive transmitting means (not shown) for transmitting the driving force from a driving source (not shown) provided in the image forming apparatus A may also be provided.

In the case where the rotation stopping and retention of the cylinder 7a and the flange 20 are effected by the caulking connection, the photosensitive drum 7 does not require the recessed portion 7g.

In this embodiment, one end side of the photosensitive drum 7 is described. This is true for the other end side of the photosensitive drum 7.

Second Embodiment

In this embodiment, a modification described below is added to First Embodiment, and other portions are similar to those in First Embodiment and therefore will be omitted from redundant explanation.

Figure 6:
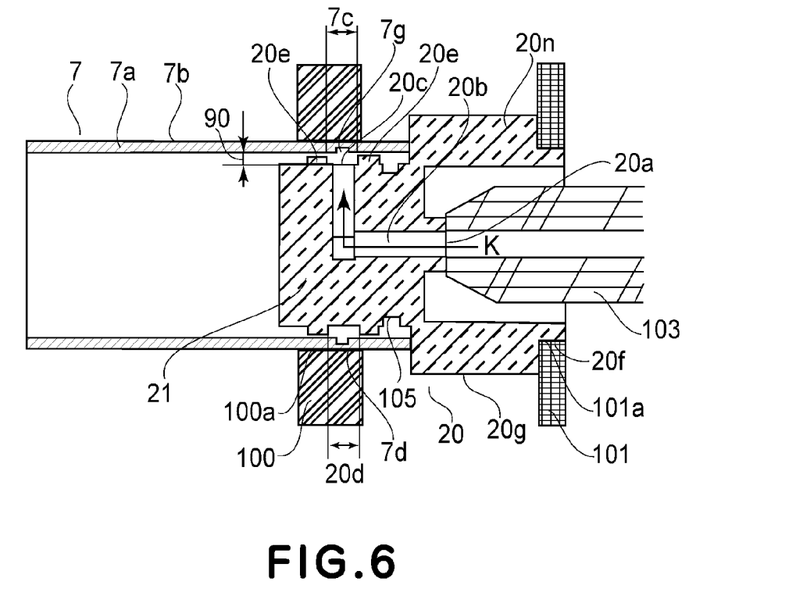
FIG. 6 is a sectional view showing a state immediately before the resin material is injected between a cylinder and a flange in a constitution in which the flange and a back-up portion are integrally molded in Second Embodiment.

FIG. 6 is a sectional view for illustrating the resin material connection between the cylinder 7a and the flange 20 in a constitution in which the flange 20 and the back-up portion 21 are integrally molded.

As shown in FIG. 6, the flange 20 and the back-up portion 21 are integrally molded. That is, inside the flange 20, the injection flow path 20b is formed. By the integral molding, it is possible to prevent leakage of the resin material in a small amount from the gap between the flange 20 and the back-up portion 21, so that the resin material can flow from the injection to the discharge with no loss.

By employing such a constitution, there is no need to provide the supporting member 102 for supporting the back-up portion 21 during the resin material injection, so that reduction in tact time and cost in the step can be realized.

Third Embodiment

In this embodiment, a modification described below is added to First Embodiment, and other portions are similar to those in First Embodiment and therefore will be omitted from redundant explanation.

Figure 9:
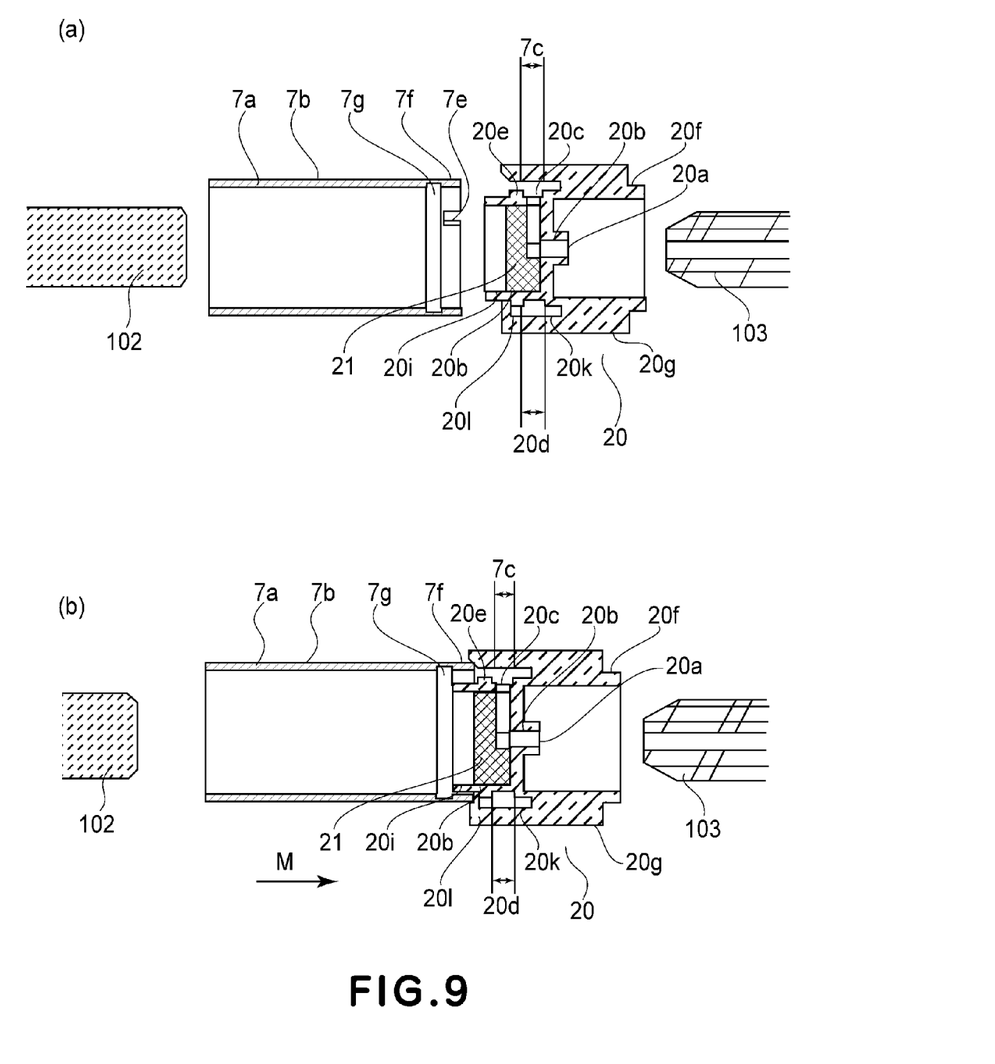
Figure 10:
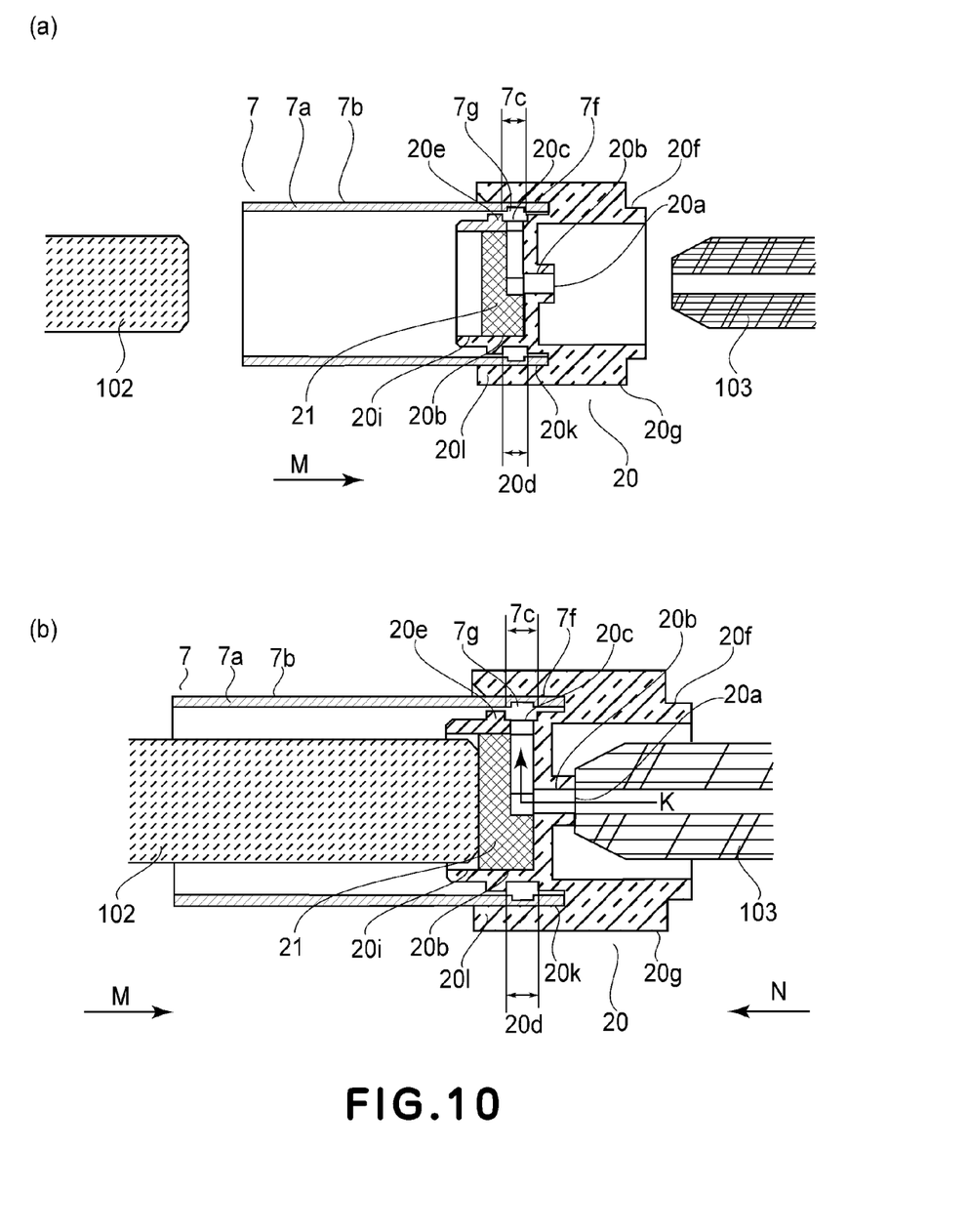

FIG. 6 is a sectional view for illustrating a state in which positional alignment is performed by engaging the flange 20 with the outer peripheral portion of the cylinder 7a. FIG. 8 is an exploded perspective view for illustrating the cylinder 7a, the flange 20 and the back-up portion 21. Parts (a) and (b) of FIG. 9 are sectional views showing a state immediately before the positional alignment between the cylinder 7a and the flange 20. Parts (a) and (b) of FIG. 10 showing a state after the flange 20 is engaged with the cylinder 7a to perform the positional alignment.

Figure 7:
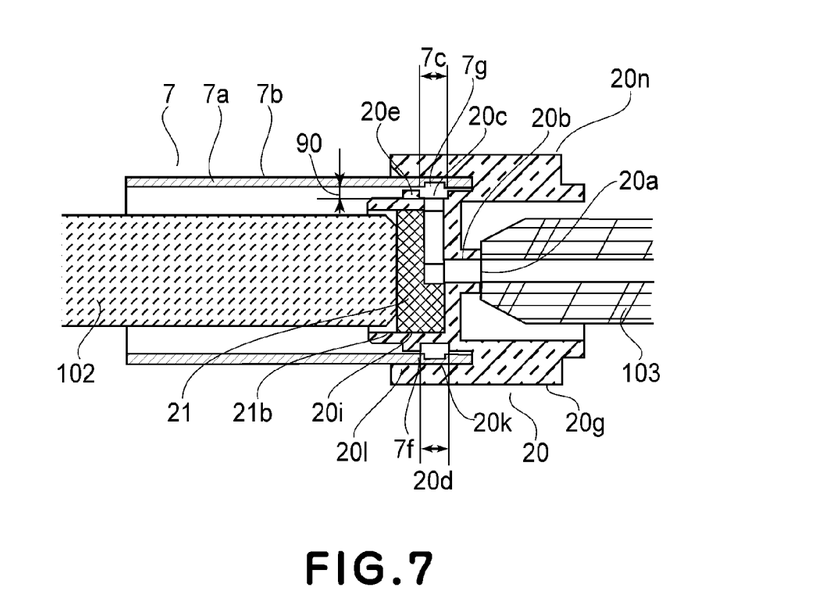
FIG. 7 is a sectional view showing a state in which a flange is engaged with an outer circumferential portion of a cylinder to effect positioning in Third Embodiment.
Figure 8:
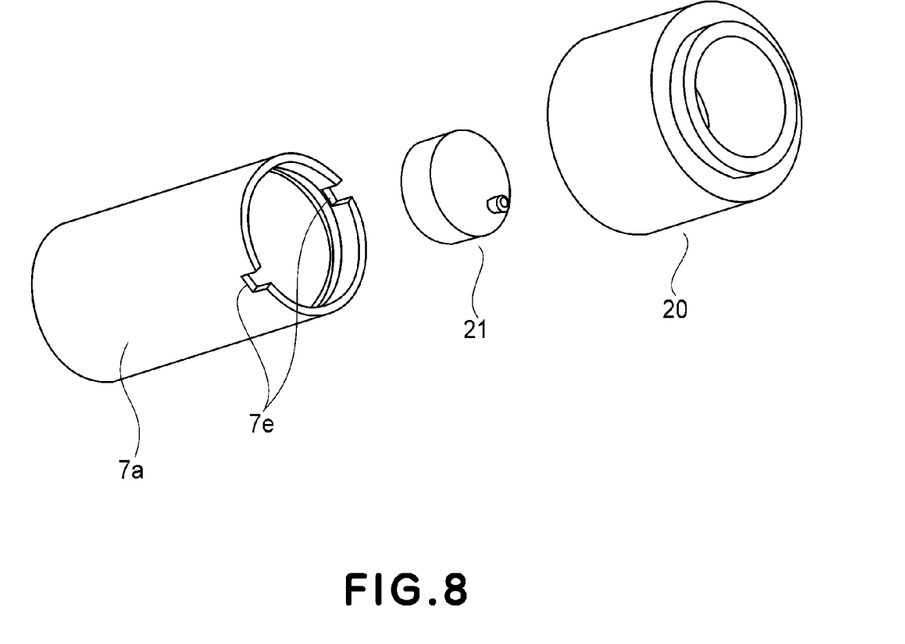
FIG. 8 is an exploded perspective view of the cylinder, the flange and a back-up portion in Third Embodiment.

As shown in FIGS. 7 and 8, the engaging portion 7f is provided at the outer diameter end portion of the cylinder 7a and is engaged with the portion to be engaged (engaging recessed portion) 20k provided at the inner circumferential portion of the flange 20 to perform the positional alignment, so that the gap 90 is formed between the connecting portion 7c and the portion to be connected 20d. The flange 20 is provided with a guide portion 201 when the cylinder 7a and the flange 20 are positionally aligned with each other. Further, as shown in FIG. 8, at the end portion of the cylinder 7a, cut-away portions 7e disposed symmetrically with respect to the center line of the cylinder 7a is provided. Projections (not shown) are provided inside the flange 20 are positionally aligned with the cut-away portions 7e provided at the end portion of the photosensitive drum 7. The cut-away portions 7e and the projections are positionally aligned with each other, so that the driving force (power) from the driving source can be transmitted from the drive transmitting means to the cylinder 7a through the flange 20.

Next, with reference to FIGS. 9 and 10, an operation of the resin material connection between the photosensitive drum and the flange will be described.

As shown in (a) of FIG. 9, the cylinder 7a, the flange 20, the nozzle 103 of the ejection molding machine and the supporting member 102 are located at retracted positions relative to other members. Further, as shown in (b) of FIG. 9, in the case where the cylinder 7a is moved toward the flange 20 in the arrow M direction and the centers of the cylinder 7a and the flange 20 are deviated from each other, the guide portion 201 provided on the flange 20 and the end portion of the cylinder 7a are contacted to each other. Further, as shown in (a) of FIG. 10, from the state of (b) of FIG. 9, the photosensitive drum 7 is further moved to the arrow M direction. Then, the end portion of the cylinder 7a is moved along the guide portion 201 of the flange 20, so that the engaging portion 7f at the outer peripheral surface of the cylinder 7a and the portion to be engaged 20k of the flange 20 are engaged and positionally aligned with each other. Further, as shown in (b) of FIG. 10, the supporting member 102 is moved in the arrow M direction to be contacted to the back-up portion 21, so that the supporting member 102 supports the back-up portion 21. After the support, the nozzle 103 of the ejection molding machine is moved in the arrow N direction to be contacted to the injection port 20a of the flange 20. After the contact, the resin material is ejected from the nozzle 103 passes through the injection flow path in the arrow K direction and is discharged from the portion 20c, so that the gap 90 and the recessed portion 7g are filled with the resin material. As a result, the cylinder 7a and the flange 20 are positionally aligned with each other, so that the flange 20 is prevented from being disconnected from the cylinder 7a.

By employing the above constitution, there is no need to use the jig for positionally aligning the cylinder 7a and the flange 20, so that the positional alignment can be realized by a simpler jig constitution.

Fourth Embodiment

In this embodiment, a modification described below is added to First Embodiment, and other portions are similar to those in First Embodiment and therefore will be omitted from redundant explanation.

Figure 11:
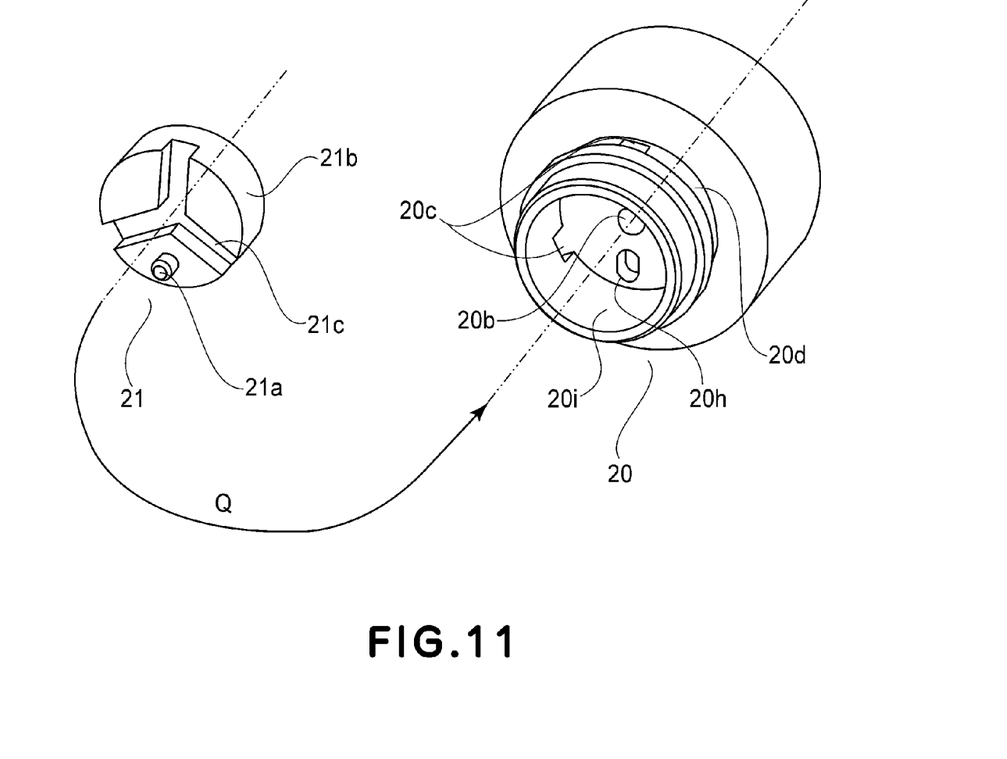
FIG. 11 is an exploded perspective view of a flange and a back-up portion in Fourth Embodiment.

This embodiment will be described with reference to FIGS. 1, 7 and 11. FIG. 11 is an exploded perspective view for illustrating the flange 20 and the back-up portion 21.

As shown in FIGS. 1 and 7, the flange 20 is provided at its end portion with the injection port 20a for permitting the injection of the resin material. As shown in FIG. 11, the injection flow path 20b (First flow path) in which the injected resin material is to be moved is provided inside the flange 20 and the discharge outlet 20c for permitting the resin material is provided in the portion to be connected 20d. The back-up portion 21 is provided at its inside portion with the injection flow path (second flow path) 21c in which the resin material from the injection flow path 20b of the flange 20 flows into the cylinder 7a. Incidentally, similar to First Embodiment, the injection flow path (second flow path) 21c is constituted by the three rectilinear flow paths (third flow path) radially extending in the radial direction of the flange 20.

By moving the back-up portion 21 in the arrow Q direction, the positioning portion 21a of the back-up portion 21 is engaged with the engaging hole 20h of the flange 20, and the outer circumferential portion 21b of the back-up portion 21 is engaged with the inner circumferential portion 20i of the flange 20, thus performing the positional alignment. Further, the injection flow path 21c of the back-up portion 21 and the discharge outlet 20c of the flange 20 are disposed so as to coincide with each other.

By employing such a constitution, irrespective of the dimensional accuracy of parts, the positioning accuracy of the flange 20 relative to the cylinder 7a can be improved. Further, there is no need to process and mold the inner diameter portion of the cylinder 7a and the outer diameter portion of the flange 20 with high accuracy and therefore processing cost can be reduced.

Incidentally, in this embodiment, the photosensitive drum 7 is constituted to be mounted in the process cartridge B but may also be directly attached to the image forming apparatus A.

The present invention is applicable to the photosensitive drum for forming and carrying the image, and to the process cartridge detachably mountable to the image forming apparatus and is also applicable to the image forming apparatus including the process cartridge.

According to the present invention, improvement in positional alignment of the flange relative to the cylinder can be realized irrespective of the dimensional accuracy of the cylinder and the flange. Further, there is no need to process and mold the inner circumferential portion of the cylinder and the outer circumferential portion of the flange, and therefore the processing cost can be reduced.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 117055/2010 filed May 21, 2010, which is hereby incorporated by reference.

What is claimed is:

1. A photosensitive drum for use with an image forming apparatus, comprising:
    a cylinder;
    a flange provided at a longitudinal end of said cylinder, wherein said flange has an outer diameter smaller than an inner diameter of said cylinder; and
    a resin material injected in a gap in a radial direction between said cylinder and said flange and fixing said flange to said cylinder,
    wherein an outer diameter portion of the flange is not in contact with an inner diameter portion of the cylinder.

2. A drum according to claim 1, wherein said flange includes a resin material flow path for introducing the resin material into the gap, an injection port through which the resin material is injected into the resin material flow path, and a discharge outlet which is provided at the outer diameter portion and through which the resin material is discharged from the resin material flow path to the gap.

3. A drum according to claim 2, wherein said resin material flow path is provided with three or more flow paths extending from a rotation center in the radial direction.

4. A drum according to claim 3, wherein the three or more flow paths are provided radially so that adjacent two flow paths form an equal angle therebetween.

5. A drum according to claim 2, wherein the flow paths, extending in the radial direction, of the resin material flow path are formed by mounting a back-up portion on said flange.

6. A drum according to claim 2, wherein said flange is integrally constituted with the flow paths, extending in the radial direction, of the resin material flow path.

7. A drum according to claim 1, wherein the gap is 0.5 mm or more and 1.5 mm or less.

8. A drum according to claim 1, wherein the inner diameter portion is provided with a recessed portion, formed along a circumferential direction, for preventing said flange from being disconnected by the resin material, injected in the gap, which enters the recessed portion.

9. A drum according to claim 1, wherein the outer diameter portion is provided with a projection, formed along a circumferential direction, for preventing the resin material, injected in the gap, from flowing out to an outside.

10. A drum according to claim 1, wherein said flange is provided with a shaft, at its end portion, with which a jig is to be engaged for permitting adjustment of a distance of the gap.

11. A drum according to claim 1, wherein said flange is provided with a recessed portion, with which an outer peripheral surface of an end portion of said photosensitive drum is to be engaged, for forming the gap.

12. A process cartridge detachably mountable to an image forming apparatus, comprising:
    a photosensitive drum including: a cylinder; a flange provided at a longitudinal end of said cylinder, wherein said flange has an outer diameter smaller than an inner diameter of said cylinder; and a resin material injected in a gap in a radial direction between said cylinder and said flange and fixing said flange to said cylinder,
    wherein an outer diameter portion of the flange is not in contact with an inner diameter portion of the cylinder.

13. A cartridge according to claim 12, wherein said flange includes a resin material flow path for introducing the resin material into the gap, an injection port through which the resin material is injected into the resin material flow path, and a discharge outlet which is provided at the outer diameter portion and through which the resin material is discharged from the resin material flow path to the gap.

14. A cartridge according to claim 13, wherein said resin material flow path is provided with three or more flow paths extending from a rotation center in the radial direction.

15. A cartridge according to claim 14, wherein the three or more flow paths are provided radially so that adjacent two flow paths form an equal angle therebetween.

16. A cartridge according to claim 14, wherein the flow paths, extending in the radial direction, of the resin material flow path are formed by mounting a back-up portion on said flange.

17. A cartridge according to claim 13, wherein said flange is integrally constituted with the flow paths, extending in the radial direction, of the resin material flow path.

18. A cartridge according to claim 12, wherein the gap is 0.5 mm or more and 1.5 mm or less.

19. A cartridge according to claim 12, wherein the inner diameter portion is provided with a recessed portion, formed along a circumferential direction, for preventing said flange from being disconnected by the resin material, injected in the gap, which enters the recessed portion.

20. A cartridge according to claim 12, wherein the outer diameter portion is provided with a projection, formed along a circumferential direction, for preventing the resin material, injected in the gap, from flowing out to an outside.

21. A cartridge according to claim 12, wherein said flange is provided with a shaft, at its end portion, with which a jig is to be engaged for permitting adjustment of a distance of the gap.

22. A cartridge according to claim 12, wherein said flange is provided with a recessed portion, with which an outer peripheral surface of an end portion of said photosensitive drum is to be engaged, for forming the gap.

23. A flange mounting method of mounting a flange to a longitudinal end portion of a cylinder, said method comprising:
 a temporary positioning step of temporarily positioning the flange with a jig so that an outer diameter portion of the flange opposes an inner diameter portion of the cylinder with a gap in a radial direction between said flange and said cylinder and so that the outer diameter portion of the flange is not in contact with the inner diameter portion of the cylinder; and
 an injection step of injecting a resin material, into the gap, for fixing the flange to the cylinder.

24. A method according to claim 23, wherein the flange includes a resin material flow path for introducing the resin material into the gap, an injection port through which the resin material is injected into the resin material flow path, and a discharge outlet which is provided at the outer diameter portion and through which the resin material is discharged from the resin material flow path to the gap, and
 wherein in said injection step, the resin material is injected into the resin material flow path through the injection port.

25. A method according to claim 24, further comprising a back-up portion mounting step of mounting a back-up portion on the flange in order to form flow paths, constituting the resin material flow path, each extending in a radial direction of the flange.

26. A photosensitive drum for use with an image forming apparatus, comprising:
 a cylinder;
 a flange provided at a longitudinal end of said cylinder, wherein said flange has an outer diameter smaller than an inner diameter of said cylinder; and
 a resin material injected in a gap in a radial direction between said cylinder and said flange and fixing said flange to said cylinder,
 wherein said flange includes a resin material flow path for introducing the resin material into the gap, an injection port through which the resin material is injected into the resin material flow path, and a discharge outlet which is provided at the outer diameter portion and through which the resin material is discharged from the resin material flow path to the gap, and
 wherein said resin material flow path is provided with three or more flow paths extending from a rotation center in the radial direction.

27. A process cartridge detachably mountable to an image forming apparatus, comprising:
 a photosensitive drum including: a cylinder; a flange provided at a longitudinal end of said cylinder, wherein said flange has an outer diameter smaller than an inner diameter of said cylinder; and a resin material injected in a gap in a radial direction between said cylinder and said flange and fixing said flange to said cylinder,
 wherein said flange includes a resin material flow path for introducing the resin material into the gap, an injection port through which the resin material is injected into the resin material flow path, and a discharge outlet which is provided at the outer diameter portion and through which the resin material is discharged from the resin material flow path to the gap, and
 wherein said resin material flow path is provided with three or more flow paths extending from a rotation center in the radial direction.

28. A flange mounting method of mounting a flange to a longitudinal end portion of a cylinder, said method comprising:
 a temporary positioning step of temporarily positioning the flange with a jig so that an outer diameter portion of the flange opposes an inner diameter portion of the cylinder with a gap in a radial direction between said flange and said cylinder; and
 an injection step of injecting a resin material, into the gap, for fixing the flange to the cylinder,
 wherein said flange includes a resin material flow path for introducing the resin material into the gap, an injection port through which the resin material is injected into the resin material flow path, and a discharge outlet which is provided at the outer diameter portion and through which the resin material is discharged from the resin material flow path to the gap, and
 wherein said resin material flow path is provided with three or more flow paths extending from a rotation center in the radial direction.

* * * * *